(12) United States Patent
Hamerschlag et al.

(10) Patent No.: US 8,705,711 B2
(45) Date of Patent: Apr. 22, 2014

(54) METHOD FOR PROCESSING A TELEPHONE CALL USING IVR FOR DELIVERY OF MULTIMEDIA MESSAGES TO A MOBILE DEVICE

(76) Inventors: Gregg Hamerschlag, Pleasantville, NY (US); Brian Lynott, Aloha, OR (US)

( * ) Notice: Subject to any disclaimer, the term of this patent is extended or adjusted under 35 U.S.C. 154(b) by 318 days.

(21) Appl. No.: 13/098,882

(22) Filed: May 2, 2011

(65) Prior Publication Data

US 2012/0281820 A1 Nov. 8, 2012

(51) Int. Cl.
*H04M 11/00* (2006.01)
(52) U.S. Cl.
USPC ............... 379/88.18; 379/88.17; 455/461
(58) Field of Classification Search
USPC ............... 379/88.17, 88.18; 455/461
See application file for complete search history.

(56) References Cited

U.S. PATENT DOCUMENTS

| 6,788,769 | B1 | 9/2004 | Waites |
| 7,013,155 | B1 | 3/2006 | Ruf et al. |
| 7,116,996 | B2 * | 10/2006 | Lazaro et al. ............... 455/466 |
| 7,526,073 | B2 | 4/2009 | Romeo |
| 7,529,538 | B2 | 5/2009 | Espejo et al. |
| 7,809,118 | B2 | 10/2010 | Saleh et al. |
| 7,895,041 | B2 | 2/2011 | Dickson et al. |
| 2002/0006782 | A1 | 1/2002 | Kim |
| 2007/0072602 | A1 | 3/2007 | Iyer et al. |
| 2007/0121817 | A1 | 5/2007 | Cai et al. |
| 2008/0095330 | A1 | 4/2008 | Jin et al. |
| 2008/0112542 | A1 | 5/2008 | Sharma |
| 2009/0149158 | A1 | 6/2009 | Goldfarb et al. |
| 2009/0196405 | A1 | 8/2009 | Romeo |
| 2010/0048227 | A1 | 2/2010 | Jaiswal et al. |
| 2010/0073453 | A1 | 3/2010 | Velarde et al. |
| 2010/0076767 | A1 | 3/2010 | Vieri et al. |

* cited by examiner

*Primary Examiner* — Simon Sing
*Assistant Examiner* — Simon King
(74) *Attorney, Agent, or Firm* — Baker Hostetler LLP

(57) ABSTRACT

A method for processing a wireless or land line telephone call from a telephone caller over a public switched telephone network (PSTN) through an IVR system for providing control to the called party for delivering SMS and/or MMS messaging to a mobile device of the caller while the call is being processed or is placed "on-hold" which may include logging of demographic information of the caller derived from the 10 digit number to form a demographic profile of the caller to differentiate and classify the caller based on the caller's demographics.

7 Claims, 2 Drawing Sheets

METHOD FOR PROCESSING A TELEPHONE CALL USING IVR FOR DELIVERY OF MULTIMEDIA MESSAGES TO A MOBILE DEVICE

FIELD OF THE INVENTION

The present invention relates to a method for processing a wireless or land line telephone call from a telephone caller over a public switched telephone network (PSTN) through an IVR for providing control to the called party for delivering SMS and/or MMS messaging to a mobile device of the caller while the call is being processed or placed on hold.

BACKGROUND OF THE INVENTION

Consumers have grown accustomed to having their phone calls answered by an IVR (Interactive Voice Response) system for routing their call to different parties and/or to generate automated voice announcements. Likewise, consumers are accustomed to being immediately placed on hold when the call is directed to a physician, even if only for making an appointment, or to a public governmental agency, utility, insurance company, airline and/or a variety of different business establishments. In each instance a conventional IVR is unable to distinguish whether the call originates from a wireless phone or a land line telephone and is unable to provide the caller with options to receive SMS and/or MMS messages from the called party while the call is being processed or when the call is placed on hold. The conventional response of an IVR system is the transmission of an audible message, advertisement or simply an announcement. The message or announcement may place the caller "on hold" until the called party or a representative of the called party becomes available. This may result in the loss of considerable time during which the caller or consumer is not productively being engaged. Moreover, limiting a telephone caller to background music and/or to an audible announcement or advertisement, particularly when placed on hold, is very frustrating to a telephone caller. Companies would prefer to be able to control what is delivered to the caller and to engage the caller/consumer in an interactive activity beneficial to both parties during these quiescent time periods which to date is not currently available.

The present invention overcomes this problem and engages the caller/consumer as the call is being processed by distinguishing between a wireless call and a wire line call and by providing the caller/consumer the option to utilize a mobile (cellular) telephone to receive SMS and/or MMS messages and/or video or links from the called party to link the mobile device of the caller to a web site of the called recipient and/or to enroll in a contest or receive coupons etc., with the information to be sent to the mobile device of the caller throughout the quiescent period while on hold or during or following the end of the call.

The present invention also provides the called party with control over the type or kind of messaging to be delivered through an IVR to a caller by detecting and logging demographic information of the caller from the telephone call and generating therefrom a demographic profile of the caller to differentiate and classify the caller based upon retrieving demographic information from the internet, such as, the median income level of the geographical area of the caller and/or information such as census data for the geographical area in which the call originates and/or the typical languages spoken in the area from which the call originates for making a selection of the type and kind of IVR message to be delivered to the caller based upon the caller profile.

DETAILED DESCRIPTION OF THE PREFERRED EMBODIMENT

Figure 1:
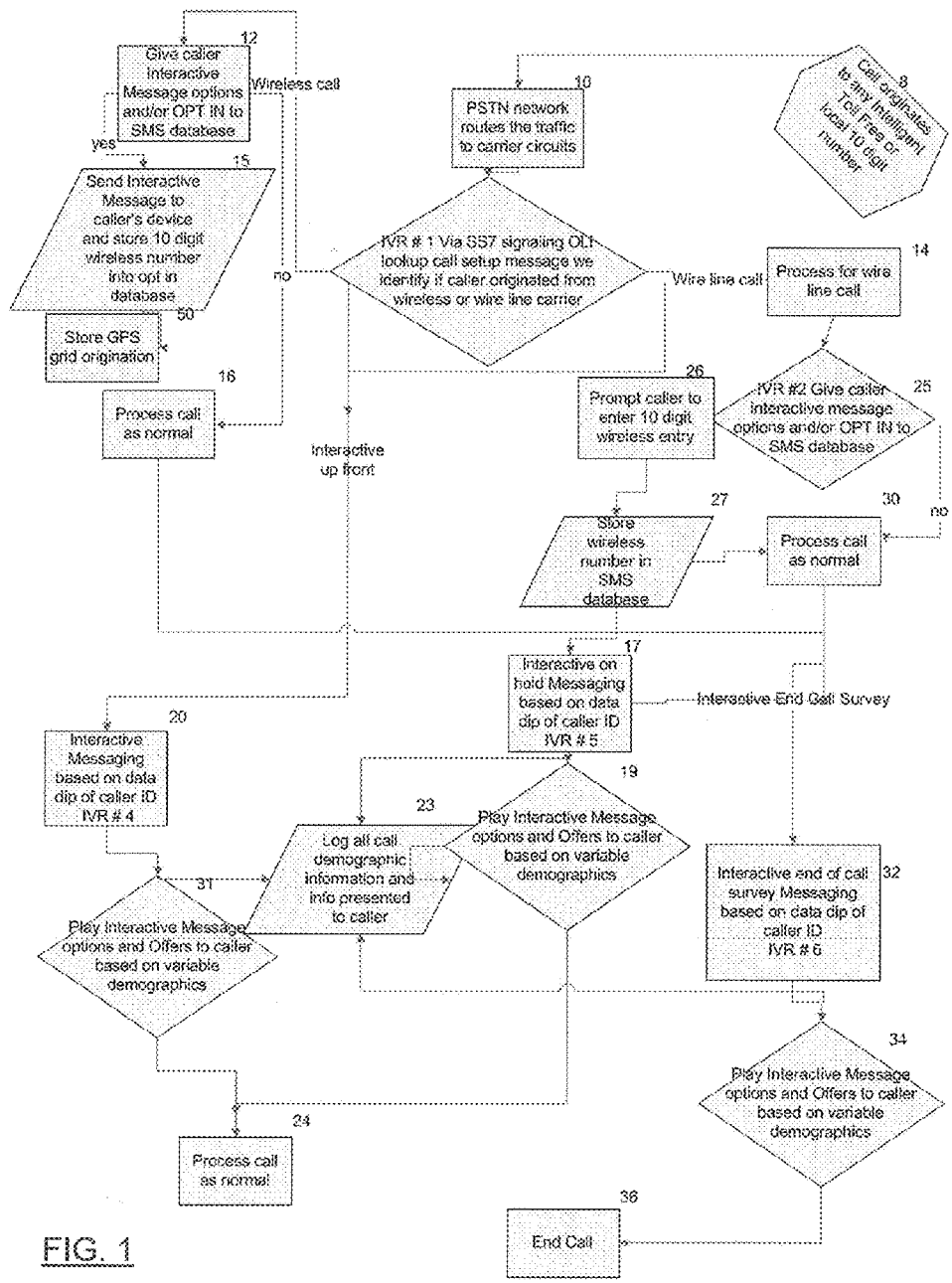
FIG. 1 is a diagrammatic flow chart of the preferred embodiment of the method of the present invention for IVR processing a wireless or land line telephone call from a telephone caller over a public switched telephone network (PSTN) and for providing control to a called party for engaging the caller/consumer in an interactive activity by means of SMS and/or MMS messaging while the call is being processed or placed on hold.
Figure 2:
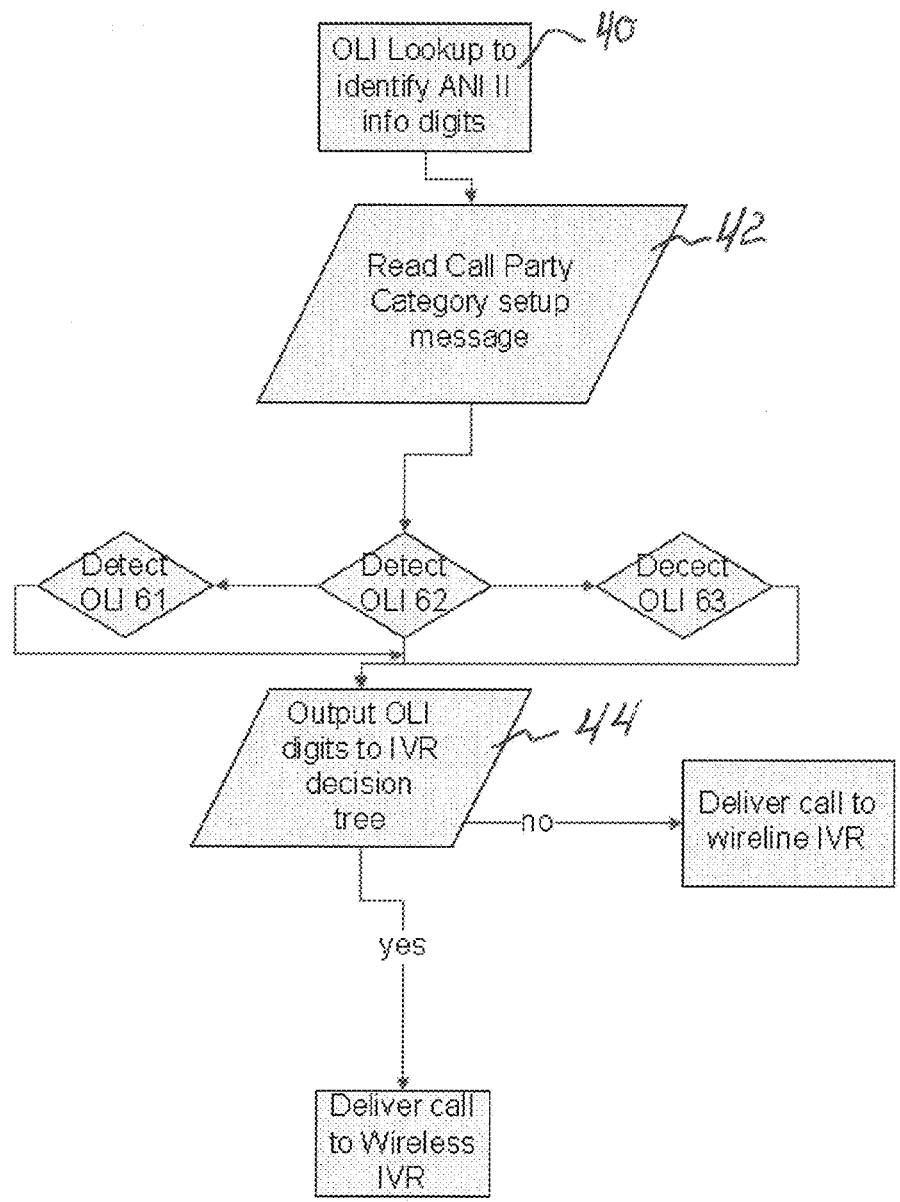
FIG. 2 is a flow diagram of the programming logic of the IVR of FIG. 1 for performing the specific operation of distinguishing between a wireless and land line telephone call from a telephone caller over a public switched telephone network (PSTN).

FIG. 1 diagrammatically illustrates the call flow sequence for processing a wireless or land line call through an IVR in accordance with the present invention. The origination of a telephone call as a toll free number or as a domestic 10 digit local number from either a mobile wireless device (not shown) such as, for example, a cellular phone or from a conventional wired land line telephone is shown in block 8. The telephone call is transmitted from block 8 through a conventional Public Switched Telephone Network (PSTN) 10 which routes the telephone call to the IVR system #1 in block 11 of FIG. 1. The IVR system #1 includes programming logic which executes a program stored in a computer (not shown) of the IVR #1 system to enable the IVR system #1 to distinguish between a wireless and wire line telephone call. This programming logic is diagrammatically illustrated in the flow diagram of FIG. 2 using the SS7 (signaling system 7) of the public switched telephone network (PSTN) 10 to find in block 40 the OLI (originating line information) call lookup which corresponds to the call party setup message for the incoming call. SS7 is the global standard for telecommunications defined by the Telecommunication Standardization Sector of the International Telecommunications Union. The call party setup message permits the programming logic in block 42 to detect and identify the existence of ANI 11 info digits as detailed by the North American Number Plan Administration (NANPA) in the OLI lookup to determine the presence of specific digits such as, for example, the digits OLI 61, OLI 62 or OLI 63 which are currently indicative of a wireless call. Accordingly, upon detecting the digits OLI 61, OLI 62 or OLI 63 in the ANI 11 info the IVR #1 in block 44 knows that the call originated as a wireless call from a mobile device and that the absence of the digits OLI 61, OLI 62 or OLI 63 in the two digit ANI 11 info is indicative of a land line call. Accordingly, the programming logic in the IVR #1 system is able to distinguish the incoming call which is thereafter processed as an incoming wireless call by the IVR #1 system in either block 12 of FIG. 1 or is processed as a wire line call in block 14 of FIG. 1. If the OLI II code for providing the ANI 11 info digits is unavailable the call type may still be determined in accordance with the present invention by searching the North American Numbering Plan NPA/NXX assignment type which will enable the programming logic to distinguish between a wireless call and a wired telephone line land call.

The computer in the IVR #1 system in block 11 is programmed as explained above to distinguish between an incoming call from a mobile wireless telephone and a land line call and includes conventional interactive voice response (IVR) technology which permits the computer in the IVR to interact with humans through the use of voice (speech recognition) and DTMF (Dual Tone Multiple Frequency) keypad inputs which conventionally allows a telephone caller to select an option from a voice menu to enable pre-recorded voice prompts to be sent to the telephone caller. The caller can respond to a voice prompt by either pressing a number on the telephone keypad of the telephone device from which the call is made or by verbally responding. Once the call is determined to be a wireless call, the call is processed in block 12 to provide the caller message options to determine if the caller is willing to "opt in", i.e., to select one of the prompts directed to receiving an SMS message, and/or an MMS message from the called party. The caller selects options from an IVR menu delivered from the IVR #1 system. If the caller selects to receive an SMS message, and/or an MMS message the programming logic in the IVR #1 will link up an SMS and/or MMS protocol for delivery of an SMS message and/or an MMS message from the www (World Wide Web) through a conventional SMS Gateway/Aggregator (not shown) and/or through a conventional MMS gateway aggregator (not shown). The delivery of an SMS short text message using a conventional SMS Gateway/Aggregator is of itself conventional. SMS (short message service) is a globally accepted wireless service that enables the transmission of alphanumeric messages to an enabled mobile phone adapted to receive the transmission of alphanumeric messages which is presently available in most mobile phone devices. The same is true for the delivery of MMS i.e., multimedia service using a conventional MMS Gateway/Aggregator. The MMS gateway permits both the called party to send multimedia messages to the mobile phone device of the caller and permits the caller also to send a message to the called party through the called party's short code platform. Once again the mobile phone must be adapted to receive MMS service. Most mobile phones currently being sold are enabled to receive and send SMS and/or MMS messages. If the caller does not have an enabled mobile phone to receive SMS and/or MMS messages the IVR #1 system will treat the selection of the caller in the same manner as if it the call originated from a land line as explained hereafter in greater detail.

The IVR system #1 of the present invention is programmed to respond to the appropriate selection of the caller to link a wireless telephone mobile device of the caller to an SMS and/or MMS protocol for delivery of an SMS message and/or an MMS message from the www if the caller selects this option or the caller may select the option to receive videos, bar codes, product information etc, of the called party. The IVR system #1 may otherwise provide the caller with internet link sites for connecting the wireless telephone mobile device of the caller to web sites, or to a database network of the called party on the internet. The caller may also send an SMS message to the called party to make an inquiry concerning a product or service of the called party and/or to indicate the desire to purchase products or services which the called party has available for sale.

The IVR system #1 will store the caller's 10 digit wireless number in the database (not shown) of the IVR system as indicated in block 15 independent of whether the caller selects any of the options provided by the IVR system #1 and independent of whether the call is placed "on hold" by the IVR system #1. The IVR system #1 will place the call "on-hold" when the caller selects "NO", i.e., selects not to receive any message or information from the IVR system and the IVR system #1 determines that the line of the called party or target recipient is "busy" and no one is available to talk to the caller. In this case the IVR system #1 will indicate to the caller that the caller is being placed "on hold" and the IVR system #1 will proceed again to offer the caller the opportunity to select from the same "opt-in" options during this quiescent time period.

The IVR system #1 is also programmed to log all incoming calls in block 18 with demographic information derived from the 10 digit number of the caller. In this regard the IVR system #1 is programmed to read and identify the location of the caller by reading the NPA/NXX assignments such as the assignment of the switch CCLI ("Common Language Location Identifier Code" switch) of the call at origination from the PSTN SS7 signaling. Using the geographic location of the caller in addition to other information readily available on the Internet the median income level of the caller may be identified, or the language typically spoken in the area of the caller may be identified or some combination thereof including available census data to form a demographic profile of the caller. The demographic profile of the caller is logged in the database of the IVR to differentiate and classify the caller based on the caller's demographics to optimize the voice prompts and the kind of information to be provided to the caller. One example of demographic differentiation in forming the demographic profile of the caller in accordance with the present invention is as follows: Assume the incoming call is coming from one city where the median income level is determined to represent a high average income per household. The IVR system #1 may then offer to the caller cost effective announcements and/or messages relating to products and services corresponding to this median income level corresponding to the demographic profile of the caller. For example assume one caller is from Mentor Ohio and another from Painesville Ohio. While Mentor and Painesville are cities in Ohio geographically located side by side to each other the median or average income is dramatically different. Painesville Ohio is determined from the call at (440) 358 whereas Mentor Ohio is determined from the call at (440) 255. The IVR #1 system may then use Wikipedia on the Internet at http:/en.wikipedia.org/wiki/Painesville, Ohio or from any other available database on the internet to obtain the median income for a family in Painesville Ohio which presently is about $41,000.00 whereas at http:/en.wikipedia.org/wiki/Mentor, Ohio to obtain the median income for a family in Median Ohio which presently is about $65,322.00. Another example would be the use of demographics from census information to offer multilingual prompts for the same two cites which presently provides the following results: In Painesville Ohio, Latinos make up 13% of the population whereas in Mentor Ohio Latinos make up less than 1 percent. Accordingly, if a called party was being called from Painesville, the IVR system would offer the caller the opportunity to receive their SMS and/or MMS messages in Spanish as their first option whereas in Mentor Ohio English would be offered first and possibly only English or Spanish as a last option.

The IVR system #1 may also determine GPS (global positioning system) grid information of the caller using an available database on the www (World Wide Web) and log this GPS information in block 50 in the formation of the demographic profile of the caller. By logging the GPS grid information of the caller the IVR system #1 knows whether the wireless phone of the caller is making a call in the geographical location corresponding to the location of the 10 digit wireless number or if the call originated in a different geographical location which may be in a different city as well as in a different state. The IVR system #1 is programmed to make this determination and will provide the caller additional options if the call originates in geographical areas where the called party has a product or service promotion available at the time the call is made that may be of interest to the caller. Interactive messages from IVR system #1 may be delivered to the caller from block 20 and block 21 based on the demographic information obtained in block 18 and block 50. Thereafter the call is processed in block 24 as a normal call between the caller and the called party until the call is ended.

If the caller is not willing to "opt in" and selects "NO" the IVR system #1 will forward the call to block 16 for processing in a normal manner with the call forwarded to the desired target recipient of the caller corresponding to the telephone number called. Even in this situation, the IVR system #1 may also be used to detect whether the call has been placed "on-hold" by the target recipient and if so offer the caller the selected options referred to above. Alternatively the call upon being received by the called party may be placed on hold by the IVR system #2 of the called party as shown in block 17. In this case the IVR system #2 will play interactive messages, as indicated in block 19, similar to the messages offered by IVR system #1. The call placed on-hold by IVR system #2 in block 17 is also forwarded to block 23 where all call demographics of the caller is logged in a manner similar to the logging of call demographics in block 18 with or without GPS information and is supplied to block 19. Accordingly, the interactive message options offered the caller in block 19 may be based on variable demographics logged in block 23.

It is understood that the IVR system #2 of the called party needs to be programmed similar to the IVR system #1 to present the caller with substantially identical options in accordance with the present invention which may include the option of transmitting an SMS message and/or an MMS message to the mobile phone of the caller by linking up to an SMS and/or MMS protocol for delivery of an SMS message and/or an MMS message from the www through a conventional SMS Gateway/Aggregator (not shown) and/or through a conventional MMS gateway aggregator (not shown) provided the mobile phone is enabled to receive SMS and/or MMS messages. The activated IVR system may also provide the caller the additional option of providing link information to enable the caller to connect the wireless mobile device of the caller to web sites, videos, or to a database network of the called party.

If the wireless number is not capable of receiving an SMS message or an MMS message the IVR system will treat the selection of the caller in the same manner as if it the call originated from a land line as explained hereafter in greater detail or transmit an error or a voice message to the caller indicating that such selection is not available. As soon as the called party comes on the line the message being delivered by the IVR #2 system is immediately interrupted unless the browser in the mobile telephone of the caller permits simultaneous receipt of messages during a phone conversation. If interrupted, the messages are sent after the call ends. During an interactive "on-hold" period generated by IVR system #2 the interactive SMS and/or MMS messages are delivered to the caller as described above in block 19 and the call is then processed as a normal call in block 24 until the call is completed. However, any messages delivered by the IVR#1 or IVR #2 which are interrupted by the called party picking up will be transmitted after the call is completed to the mobile phone of the caller.

If the IVR system #2 does not place the call being processed in block 16 "on-hold" the call is routed to an interactive end call survey in block 32 to permit the caller to receive end of call survey messages which may or may not be based on the callers demographics supplied from block 23. The end of call survey messages are delivered from block 34 before terminating the call in block 36.

When the IVR system #1 distinguishes the incoming call as a land line call the call is forwarded to block 14 for processing. The IVR system #1 processes the land line call in a somewhat similar manner as with a wireless call by offering the caller selected options in block 25 including the option to "opt-in" to receive SMS and/or MMS messages. However, if the caller wishes to "opt-in" the caller will then be prompted in block 26 to enter a 10 digit wireless number to enable the IVR system #1 to deliver SMS and/or MMS messages exactly as described in the process for a wireless call to the 10 digit wireless phone identified by the caller. The ten digit number is logged in the database of the IVR system #1 in block 27. The process operation in block 25 of offering interactive messages or announcements and/or the option to "opt-in" for receiving SMS and/or MMS messages is identical to that described in block 15 for a wireless call with the exception of the prompt in block 26 to the caller to enter a 10 digit wireless entry to enable the IVR system to deliver SMS and/or MMS messages. Thereafter, the call is processed in block 30 as a normal call exactly as it was processed in block 16 and the call is forwarded to the called party. The IVR system #2 of the called party will be activated in block 17 when the call is forwarded to the called party from block 30 and may place the call "on-hold". However, if the IVR system #2 does not receive the 10 digit number from block 27 and the call is placed on hold by the IVR system #2 in block 17 the caller will not be sent any SMS and/or MMS messages. The IVR system #2 will still play interactive messages in block 19 which may be determined by the caller's demographics from block 23 exactly in the same manner as described for a wireless call.

If the IVR system #2 does not place the land line call being processed in block 30 "on-hold" through block 17 the call will be routed to an interactive end call survey in block 32 to permit the caller to receive end of call survey messages which may or may not be based on the callers demographics supplied from block 23. The end of call survey messages are delivered from block 34 before terminating the call in block 36.

The invention claimed is:

1. A method for processing a wireless or land line telephone call from a telephone caller to a called party over a public switched telephone network (PSTN) through an IVR system for providing control to the called party for delivering SMS or MMS messaging to a mobile device of the caller while the call is being processed or is placed "on-hold" comprising the steps of :

using the IVR system to detect the call origination of a telephone call from a public switched telephone network using the originating line information ("OLI") call lookup to determine if the call origination is from a land line telephone or from a wireless mobile device;

providing the caller the option to receive messages from a first selected menu of options through the IVR system when the call origination is a wireless call including the option to interactively receive or transmit on the mobile device of the caller, messages and information selected from the group consisting of SMS, audio ,MMS and video or to link the mobile device of the caller to a web site on the internet before the call is routed to the desired recipient of the caller;

detecting the selected option of the caller and sending interactive messages to the caller when the caller opts in to receive interactive messages with the SMS or MMS messages delivered to the mobile device of the caller;

providing the caller a second selected menu option when the call origination is a wire line land call requesting the caller to provide a 10 digit numerical entry of a corresponding wireless telephone device of the caller before the call is routed to the desired recipient of the call;

detecting if the caller has entered the 10 digit numerical number corresponding to a mobile phone, sending interactive messages to the caller when the caller opts in to receive interactive messages and has entered a 10 digit numerical number with the SMS or MMS messages delivered to the mobile device corresponding to the entered 10 digit number or sending interactive messages which do not include SMS or MMS messages when the caller has not entered the 10 digit numerical number;

detecting when the call is placed on hold and the caller has not selected to opt-in to receive interactive messages, and offering the caller the option to receive, on a wireless line of the caller or on the 10 digit numerical number corresponding to a mobile device identified by the caller and while the call is on hold, messages and information selected from the group consisting of SMS, audio ,MMS and video or to link the mobile device identified by the caller to a web site on the internet.

2. A method as defined in claim 1 wherein the IVR system detects the call origination by reading the call party category setup message to identify the existence of predetermined ANI info digits which correspond to a wireless call when the predetermined digits are present or a land line call when the predetermined digits are absent.

3. A method as defined in claim 2 further comprising logging demographic information of the caller derived from the 10 digit number to form a demographic profile of the caller selected from one or more demographics comprising: the location of the wireless phone from which the call originates, the median income level at such location, the languages spoken in the geographic area corresponding to the location of the caller and GPS grid information of the wireless phone of the caller at the time of the call.

4. A method as defined in claim 3 wherein the interactive message options offered the caller by the IVR system are based on a selection of the variable demographics representing the logged demographic profile of the caller.

5. A method as defined in claim 2 wherein the IVR system provides the caller of a wireless phone or a land line phone in which the caller provides a 10 digit wireless number with the additional option of sending link information to enable the caller to connect the wireless mobile device corresponding to such 10 digit number to web sites or a database network of the called party.

6. A method as defined in claim 5 wherein a first IVR system is used to determine the call origination of the telephone call and a second IVR system corresponding to the IVR system of the called party is used for placing the call on hold and sending interactive messages to the caller when the caller opts in to receive interactive messages.

7. A method as defined in claim 6 wherein when the caller elects not to receive interactive messages and the call is processed as normal the call is routed upon completion to an interactive call survey wherein the caller is presented with end of call options to receive interactive messages.

* * * * *